(12) United States Patent
Pope et al.

(10) Patent No.: US 8,001,885 B2
(45) Date of Patent: Aug. 23, 2011

(54) FILL TUBE LINER

(75) Inventors: Randy D. Pope, Edinburg, IL (US); John Roth, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1338 days.

(21) Appl. No.: 10/531,566

(22) PCT Filed: Oct. 15, 2003

(86) PCT No.: PCT/US03/33003
§ 371 (c)(1),
(2), (4) Date: Sep. 29, 2005

(87) PCT Pub. No.: WO2004/035385
PCT Pub. Date: Apr. 29, 2004

(65) Prior Publication Data
US 2006/0096463 A1    May 11, 2006

Related U.S. Application Data

(60) Provisional application No. 60/418,610, filed on Oct. 15, 2002.

(51) Int. Cl.
*A47J 31/00* (2006.01)

(52) U.S. Cl. .............................. 99/306; 99/307; 392/442

(58) Field of Classification Search ................... 99/307, 99/306, 305, 304; 392/442, 441, 444
See application file for complete search history.

(56) References Cited

U.S. PATENT DOCUMENTS

| | | | |
|---|---|---|---|
| 3,385,201 A | 5/1968 | Martin | |
| 3,494,276 A | 2/1970 | Martin | |
| 3,808,961 A * | 5/1974 | Grossenbacher | 99/281 |
| 4,142,840 A * | 3/1979 | Kemp | 417/209 |
| 4,143,589 A | 3/1979 | Weber | |
| 4,402,257 A * | 9/1983 | Marotta | 99/307 |
| 4,676,148 A | 6/1987 | Foley | |
| 4,920,871 A | 5/1990 | Anson et al. | |
| 6,192,192 B1 | 2/2001 | Illy et al. | |
| 6,367,370 B1 | 4/2002 | Sham et al. | |
| 6,439,106 B1 | 8/2002 | Sham et al. | |
| 6,460,735 B1 | 10/2002 | Greenwald et al. | |

FOREIGN PATENT DOCUMENTS

GB    2123273    *  2/1984

* cited by examiner

*Primary Examiner* — Reginald L Alexander
(74) *Attorney, Agent, or Firm* — Barnes & Thornburg LLP

(57) ABSTRACT

Disclosed is an apparatus, method and kit for use with a beverage producing device. Included are a fitting and an insulating tube for insulating water being introduced into a heated water tank from heated water retained in the tank. Use of an insulating tube helps to reduce the heat transfer between the heated water retained in the tank and the water being introduced to the tank.

11 Claims, 3 Drawing Sheets

FILL TUBE LINER

CROSS-REFERENCE TO RELATED APPLICATIONS

The present application claims the benefit of PCT Application No. PCT/US03/33003 filed on Oct. 15, 2003 and U.S. Provisional Application No. 60/418,610 filed on Oct. 15, 2002.

BACKGROUND

The present disclosure relates to a system, method, apparatus and kit for reducing thermal loss during the production of beverages.

There are numerous beverage dispensers that may benefit from the present disclosure, for example, coffee brewers, tea brewers or beverage concentrate dispensers or any other beverage dispenser that produces hot beverages.

Beverage dispensers, such as those mentioned above, require a source of hot water. Typically a hot water tank is the source of the hot water needed for producing beverages. Beverage dispensers with hot water tanks receive water from an inlet water source such as a pressurized line or a pour over fill basin, which provides unheated or under heated water. A heating device associated with the hot water tank then heats the water added.

As the water within the tank is heated it generally rises as the result of convection currents. This rise of hot water generally causes the hottest water to collect in an upper portion of the hot water tank while the colder water remains in a lower portion.

In many types of beverage producing systems, the unheated water which enters the hot water tank does so from an opening in or near a top surface of the hot water tank. The opening maybe in communication with a tube, which descends into the hot water tank from the opening and terminates near a bottom portion of the tank.

Briefly, a system, method, apparatus and kit for reducing the heat transfer surrounding a fill tube is disclosed. The apparatus includes a fitting having a flange end and a retaining end. The flange end of the fitting is attached to a water supply basin or a water supply line while the retaining end engages an insulating tube. The insulating tube is placed within a preexisting tube in a heated water tank of a beverage producing system and may be cut or otherwise adjusted to an appropriate length. The insulating tube is formed of a suitable material which reduces heat transfer.

The present disclosure may be employed as part of a manufacturing process for the production of beverage producing systems. Additionally, the present disclosure may be manufactured as a "retro-fit" or add-on kit. As such a kit, the present disclosure would allow for existing beverage producing systems to benefit from the improved functioning of a reduced heat transfer tube.

Additional features will become apparent to those skilled in the art upon consideration of the following detailed description of drawings, illustrative of at least one embodiment of the disclosure.

BRIEF DESCRIPTION OF THE DRAWINGS

The detailed description particularly refers to the accompanying figures in which.

DETAILED DESCRIPTION

Figure 1:
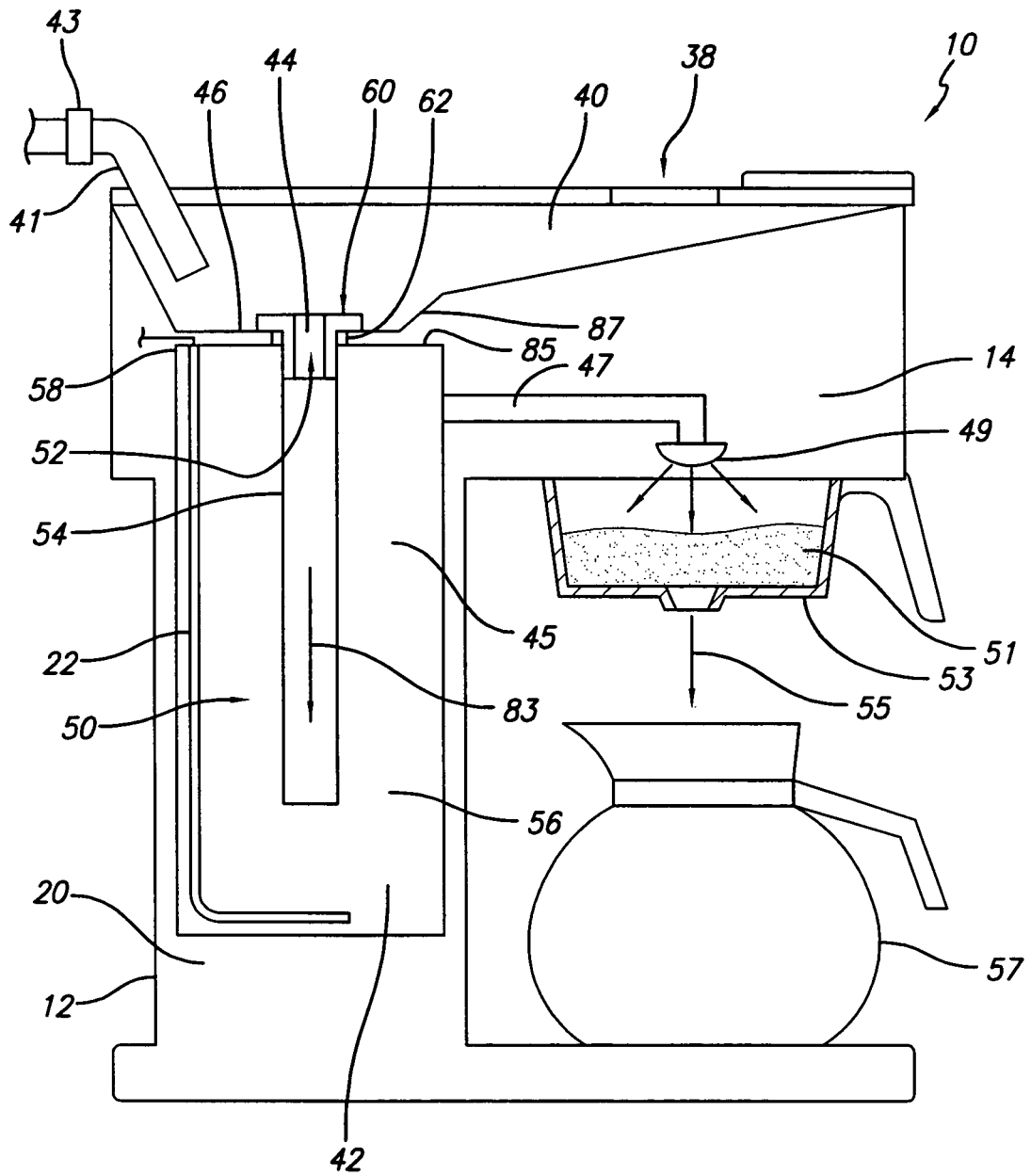
FIG. 1 is a diagrammatic side elevational view of a beverage producing system.

While the present disclosure may be susceptible to embodiment in different forms, there is shown in the drawings, and herein will be described in detail, at least one embodiment with the understanding that the present description is to be considered an exemplification of the principles of the disclosure and is not intended to limit the disclosure to the details of construction and the arrangements of components set forth in the following description or illustrated in the drawings.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of dispensing, infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

It should be noted that some features of the invention disclosure may be shown in general or diagrammatic form in the interest of clarity in describing various features. These diagrammatic illustrations should be given their broadest interpretation and should include the specific embodiments shown and described as well as equivalents thereof.

With reference to the figures, a brewer or beverage making system 10 is shown in FIG. 1. The brewer 10 generally is an apparatus for brewing or otherwise producing beverages, such as a coffee brewer. An exterior of the brewer 10 is defined by a housing 12. The housing 12 also defines an interior cavity 20. In one embodiment the housing 12 is formed of stainless steel, however any suitable material known to those of skill in the art may be employed.

A heated water tank 50 defined by a tank wall 83 and top 85 is located within the housing 12. Heated water needed in the brewing process is produced within the hot water tank 50 by means of a heating element 22. The unheated fill water that enters heated water tank 50 is chilled, heated or ambient temperature water. The fill water enters tank 50 via tank inlet aperture 44. The heating element 22 as shown in FIG. 1 is located within the tank 50. It should be noted that the heating element may take a variety of forms both located in the tank and exteriorly of the tank. When located in the tank the heating element may extend into the tank at a suitable depth and be configured in a suitable shape to provide desired heating results. Additionally, the heating element 22 may be positioned exteriorly of the tank and positioned proximate to the tank to transfer heat energy to water retained in the tank.

The system as shown in FIG. 1 generally shows a system referred to as a "pour-over" system. Such a system can be found in U.S. Pat. Nos. 4,670,148 and 3,494,276 assigned to the assignee of the present disclosed device. Generally, in such systems water is introduced into a reservoir 40 or other opening or may be introduced by means of a water line 41 having a controllable valve 43 thereon. Such a controllable water line will introduce a pre-determined quantity of water based on the amount of time that the valve is in the open position. Using either system, as water 51 is introduced into the basin 40 it flows through the tank inlet aperture 44 and through the fill tube 54 connected to the opening 44. The connection between the basin 40 and the fill tube 54 may be that as shown in U.S. Pat. No. 4,676,148 and incorporated herein by reference or other structures which may be known to one of skill in the art. As water 51 is introduced from the basin 40 to the tank 50, the water being introduced to a lower portion 42 of the tank displaces water in an upper portion of the tank 45. The water is displaced from the upper portion 45 as it flows through an outlet port 47 for dispensing through a spray head 49 over brewing substance 51 retained in a brewing basket 53. Water displaced and dispensed into the brewing substance produces a brewed beverage 55 which is dispensed into a carafe 57 there below.

As noted above, the fill water flowing from the basin 40 travels through the tube 54 to the lower portion 42 of the tank 50. The temperature of the water flowing through the tube 54 is generally at a lower temperature than the heated water retained in the tank 50. Also, prior art tubes typically are not thermally insulated and as such result in the heat transfer between the ambient or cooler water 51 flowing through the tube 54 and the heated water, especially in the upper portions 45 of the tank 50. Heat transfer results in a cooling of the water in the upper portion 45 of the tank 50 and reduces the temperature of the brew water dispensed through the outlet 47. As a result, the overall temperature in the tank 50 tends to decrease when fill water is added to the basin 40. The present disclosure employs the structures described herein below namely an insulating tube 78 which is retained internally or externally of the tube 54 to help facilitate insulating and thus reduce heat transference through the fill tube 54.

A fitting 60 is generally provided to removably attach basin outlet aperture 44 to tank inlet aperture 52 and forms a watertight seal. The fitting 60 has a flangedly mounted portion 74 and is mounted on an interior surface 46 of the lower portion 87 of basin 40. The fitting 60 protrudes beyond the interior surface 46, through outlet aperture 44 and a gasket 62 and engages a fastener 58 on top 85 of hot water tank 50. Fastener 58 may take the form of a threaded portion of the tank inlet aperture 52. Gasket 62 serves to form a watertight seal between the basin 40 and the hot water tank 50. In one embodiment the fastener 58 may be a threaded portion, however any suitable means of fastening known to those of skill in the art may be employed without departing from the scope of the present disclosure.

As discussed in the background, water 51 traveling down fill tube 54 will absorb heat from the hot water within hot water tank 50, through fill tube 54. As shown in the figures, an apparatus can be provided as a kit of elements for retrofitting the brewer 10, as shown in FIG. 1. Additionally, the apparatus of the present disclosure may be included in a newly manufactured brewer having reduced heat transfer within the hot water tank 50.

Figure 2:
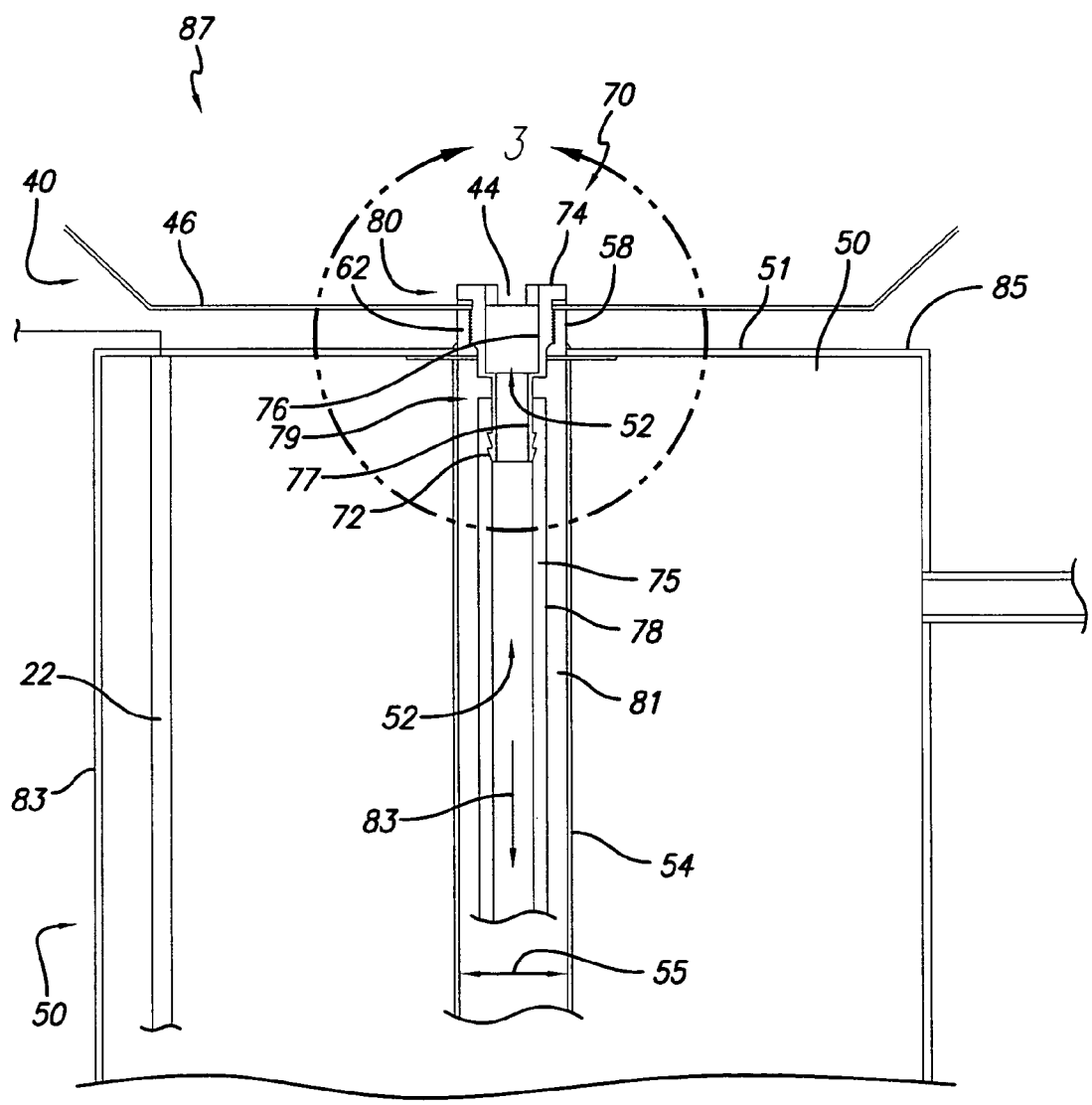
FIG. 2 is an enlarged diagrammatic side elevational view of the beverage producing system shown in FIG. 1 with the apparatus of the present disclosure installed therein.
Figure 3:
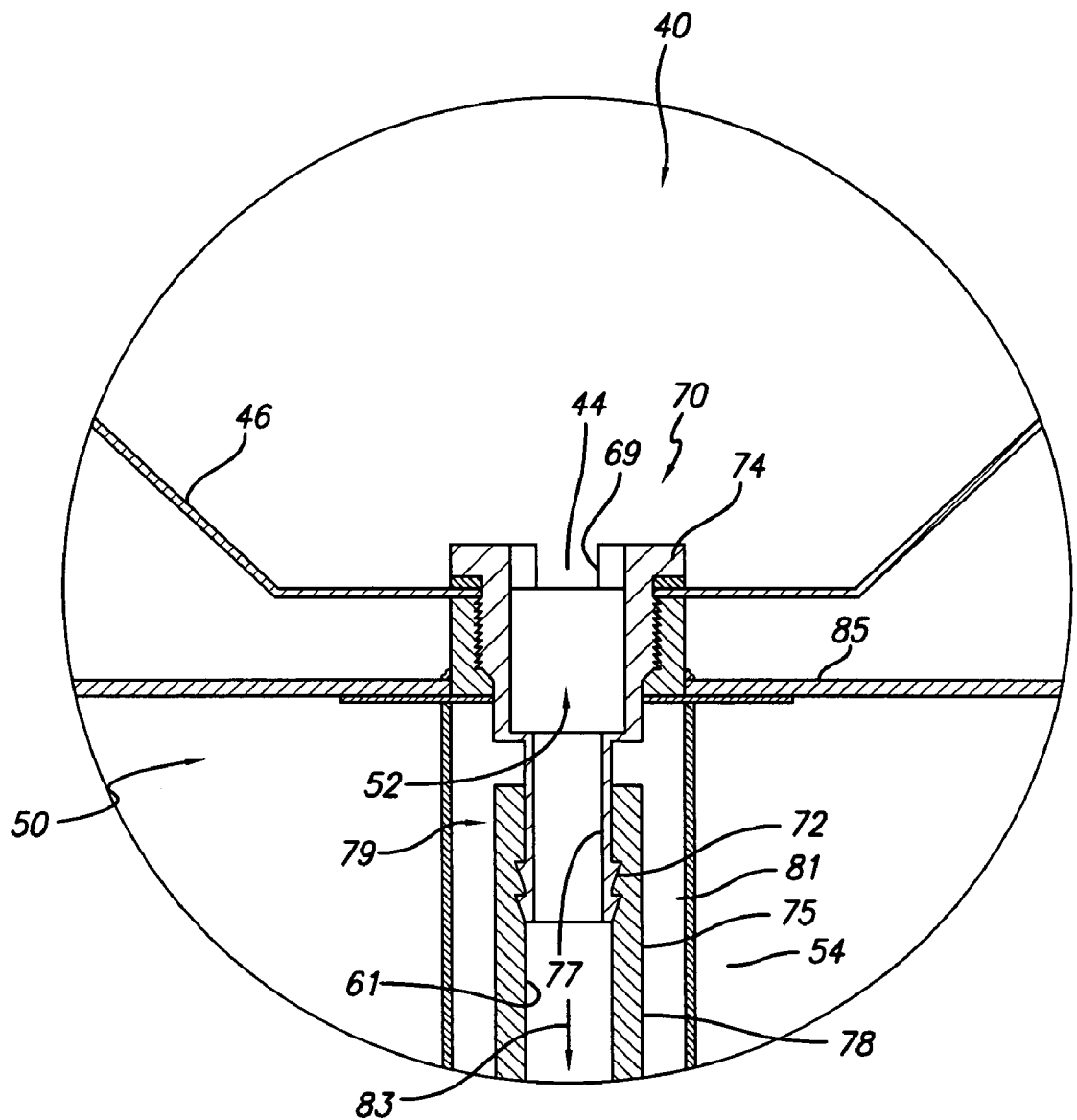
FIG. 3 is an enlarged diagrammatic side elevational view of a portion of the beverage producing system of FIG. 2.

In a retrofit kit of elements, instructions are provided for removing an existing structure and replacing the structures to achieve the device as set forth in this disclosure. The kit includes at least an insulating fitting 70 and an insulating tube 78. When using such a retrofit kit, the fitting attached to the machine is removed and replaced with an insulating fitting 70 and with an insulating tube 78 attached thereto. With reference to FIGS. 2 and 3, the insulating fitting 70 may include barbs 72 for retaining the insulating tube 78 thereon. Additionally, it will be understood that the tube 78 can be attached or formed on the fitting 70 in any suitable manner. Further, it will be appreciated that one of ordinary skill in the art will have the ability to remove an existing fitting and replace it with an insulating fitting of the present disclosure. The insulating fitting 70 includes barbs 72, a flange 74 and a fastener or threaded portion 76. The barbs 72 are provided on a terminal end 79 of insulating fitting 70. The barbs 72 protrude from an external surface 77 of terminal end 79 of insulating fitting 70 for engaging an interior surface 61 of the insulating tube 78. In one embodiment, the barbs 72 may be annularly disposed about the circumference of insulating fitting 70. Other orientations and structures of barbs 72 may be employed without departing from the scope of the present disclosure. For example, ridges or interrupted ridges may be employed.

The flange 74 engages a gasket 63 against an interior surface 65 of a lower portion 87 of basin 40. The remaining axially extending portion of insulating fitting 70 protrudes through basin outlet aperture 44 with the threads 76 engaging fitting 67 on the top 85 of the tank 50. Insulating fitting 70 serves to removeably attach basin 40 to hot water tank 50. The attachment forms a watertight communication passageway between basin 40 and hot water tank 50. The insulating fitting identified as an insulating fitting since it can be formed of a suitable plastic or other insulating material. Generally, the material is chosen so as to reduce the communication of heat or heat transfer between the insulating tube 78 and other structures. It should be noted, however, that while an insulating fitting is identified, other fittings may be used although some reduction in heat efficiency may occur.

The insulating tube 78 is attached to insulating fitting 70 by telescopically positioning an open end of the tube 78 over the barbs 72. The insulating tube 78 may have an inner diameter slightly greater than an outer diameter of the terminal end 79 of insulating fitting 70. The wall thickness 75 of insulating tube 78 may vary, but in any embodiment must be sufficiently thick, depending on the type of material used to form the tube, to provided adequate or desired thermal insulation. The overall outer diameter of the insulating tube 78 is generally less than an inner diameter 55 of fill tube 54 so that the insulating tube 78 may be inserted into the fill tube 54. If a gap 81 is defined between the fill tube 54 and the insulating tube 78, water will flow into the gap 81 providing some degree of additional insulation for the fill tube 54.

The insulating tube 78 may be formed of any material having suitable insulating properties. In one embodiment, the insulating tube 78 is formed of food grade silicone. While silicone is disclosed in at least one embodiment, any material having suitable thermal insulating properties known to those of skill in the art may be used without departing form the scope of the present disclosure. For example, rubber or plastic may be used.

The insulating tube 78 is attached to the barbs 72 of insulating fitting 70 by sliding the insulating tube 78 over the barbs 72. As insulating tube 78 passes an area of increased diameter produced by the each barb 72, the insulating tube 78 stretches over the barbs 72. The insulating tube 78 positioned over the barbs 72, causes the barbs 72 to engage an inside surface of the insulating tube 78 thereby generally preventing removal.

The insulating tube 78 extends past the terminal end 79 of insulating fitting 70 into fill tube 54. The insulating tube 78 may extend the entire length of fill tube 54 or may terminate a distance from the point at which fill tube terminates. The present disclosure also envisions insulating tube 78 may be provided with excess length. A user may trim the insulating tube 78 to a desired length during the installation process. Additionally, insulating tube 78 may extend beyond the point at which fill tube 54 terminates thereby delivering cold water directly into the lower portion 56 of hot water tank 50.

With the insulating tube 78 in place within fill tube 54, heat loss from the hot water contained within hot water tank 50 to the fill water flowing through fill tube 54 will be diminished. For example, when a user introduces water into basin 40 the water will leave basin through basin outlet aperture 44 by means of insulating fitting 70. The water will pass through insulating fitting 70, through insulating tube 78 and into a lower portion 56 of hot water tank 50 generally without direct contact with the fill tube 54. The water within insulating tube 78 generally will not contact with the metallic walls of fill tube 54. By preventing contact between the cold water contained within insulating tube 78 and fill tube 54, heat transfer due to conduction from the heated water within tank 50 and the cold water within insulating tube 78 will be at least substantially diminished or eliminated.

By reducing or eliminating the potential for heat loss due to conduction, the cold water may be introduced into hot water tank 50 for heating with improved efficiency. Additionally, the hot water contained within hot water tank 50 will not cool as rapidly because of the reduced conductive heat loss. This results in providing more higher temperature water to increase the number of brewing cycles which can be produced from a limited quantity of heated water.

As an additional consideration, while the present disclosure discusses a basin 40 as a source of water for hot water tank 50, other sources of water are possible. For example, a pressurized water line may be placed in communication with tank inlet aperture 52 for communicating water directly from a pressurized municipal water system into the hot water tank 50.

Another feature of the present disclosure involves the use of the insulating tube 78 apart from a preexisting fill tube 54 within a hot water tank 50. For example, in a newly fabricated brewer 10, the tank inlet aperture 52 of the hot water tank 50 may be provided with only the insulating tube 78 flangedly, or otherwise mounted thereon. In this embodiment, the insulating tube 78 may protrude through the tank inlet aperture 52 and descend downwardly into hot water tank 50 without the need for a preexisting fill tube 54.

In use, the apparatus and kit of the present disclosure is used to improve the heating efficiency and heating characteristics of a hot water tank 50 employed with a beverage producing system 10. In this regard, use of the insulating tube 78 is to reduce the heat transfer between heated water in the tank and unheated water or underheated water flowing into the tank. In use, as water is introduced into the tank 50 through the fill or inlet aperture 44 water flows downwardly towards a lower portion 42 of the tank. In the absence of the insulating tube 78 some heat transfer may occur between the tube 54 extending downwardly toward the lower portion 42 of the tank. By insulating this path through which the water 51 flows, the unheated water does not absorb or draw heat from the heated water. By maintaining the heated water in its heated condition, the heated water can be maintained at a desired temperature level.

In use, a retrofit kit or installation assembly is provided. The installation assembly includes the fitting 70 and the tube 78. In an initial installation such as in a manufacturing environment the assembly is positioned with the fitting 70 extending through the aperture 44 in the basin. The insulating fitting 70 extends into the fitting 67 which is attached to the top 85 of the tank 50. An external portion of the fitting is threaded 76 to engage to a corresponding internal surface of the fitting 67. Driving slots 69 are provided in a top portion of the fitting 70 to facilitate engagement by a screwdriver or other engaging device to promote driving engagement of the threads 76. Prior to engaging the fitting 70 with the fitting 67 a gasket 63 is positioned under the flange 74 to feel the basin 40. The fitting 67 is attached to the top 85 by any suitable means including fasteners, welding, adhesives or any other suitable way of attaching such a fitting 67. Additionally, the fitting 70 may not be provided with threads with the fitting 67 being provided with threads. In this arrangement, the threads in the fitting 67 can be used to form threads on a corresponding exterior surface of the fitting 70. It is also envisioned that any number of other engagements between the fitting 70 and the fill tank 50 can be employed consistent with this disclosure. As such, the fitting and arrangement and engagement with the tank as shown and described herein should not be considered to be limiting but should be broadly interpreted.

The tube 78 can be attached to the fitting 70 over the barbs 72. This can be done prior to installing the fitting 70 if the aperture through which the fitting fits is sufficiently large or after initial installation of the fitting 70 through the aperture 44. Regardless of when the tube 78 is attached over the barbs 72 the tube 78 is attached to the fitting 70. The tube can extend through a preexisting fill tube 54 or may extend into the tank 50 without the additional fill tube 54. The fill tube 54 may be angled or oriented in a direction to position the fill tube away from or proximate to a heating element. As shown in the figures, the fill tube 54 is attached by any suitable means such as welding, adhesives, mechanical fasteners or other devices so as to retain the fill tube in the tank 50.

While an embodiment has been illustrated and described in the drawings and foregoing description, such illustrations and descriptions are considered to be exemplary and not restrictive in character, it being understood that only an illustrative embodiment has been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are several advantages of the present disclosure arising from various features set forth in the description. It will be noted that alternative embodiment of the disclosure may not include all of the features described yet still benefit from at least some of the advantages of such features. Those of ordinary skill in the art may readily devise their own implementations of the disclosure and associated methods that incorporate one or more of the feature of the disclosure and fall within the spirit and scope of the present disclosure as defined by the impendent claims.

The invention claimed is:

1. A beverage making apparatus comprising:
    a heated water tank;
    a heating element operatively associated with the heated water tank for heating water therein;
    the heated water tank defining an inlet aperture therein for receiving water to be disposed in the heated water tank;
    a fill tube positioned in the heated water tank and positioned in alignment with the inlet aperture;
    an insulating tube positioned in the fill tube communicating with the inlet aperture for receiving water there through and providing water to the heated water tank; and
    a gap being defined between the outside of the insulating tube and inside of the fill tube for providing additional insulation.

2. The beverage making apparatus of claim 1, further comprising a fitting for attachment to a heated water tank and the insulating tube.

3. The beverage making apparatus of claim 1, further comprising the fitting being formed of an insulating material.

4. The beverage making apparatus of claim 1, further comprising a gasket for use with the fitting for sealing the fitting.

5. The beverage making apparatus of claim 1, further comprising the fitting having barbs formed thereon for retaining the tube on the fitting.

6. A kit for installing an insulating tube in a heated water tank, the kit comprising:
   an insulating tube formed of a thermally insulating material being sized and dimensioned for installation inside of a fill tube of the heated water tank for delivering water to the heated water tank
   a gap being defined between the outside of the insulating tube and inside of the fill tube for providing additional insulation; and
   a fitting for attachment to a heated water tank and the insulating tube.

7. The kit as in claim 6, further comprising the fitting being formed of an insulating material.

8. The kit as in claim 6, further comprising a gasket for use with the fitting for sealing the fitting.

9. The kit as in claim 6, further comprising the fitting having barbs formed thereon for retaining the tube on the fitting.

10. A method for reducing heat transfer in a heated water tank, The method comprising the steps of:
    providing a heated water tank;
    providing a heating element operatively associated with the heated water tank for heating water therein;
    a fill tube positioned in the heated water tank and positioned in alignment with the inlet aperture;
    providing an inlet aperture in the heated water tank for receiving water to be disposed in the heated water tank;
    providing an insulating tube positioned in the fill tube communicating with the inlet aperture for receiving water there through;
    a gap being defined between the outside of the insulating tube and inside of the fill tube for providing additional insulation; and
    dispensing water through the insulating tube for disposing unheated water into the heated water tank.

11. An insulation assembly for use in a beverage producing apparatus of the type having a heated water tank to deliver water to the heated water tank, a heating element operatively associated with the heated water tank for heating water therein, the heated water tank defining an inlet aperture therein for receiving water to be disposed in the heated water tank, the insulating insulation assembly comprising:
    a fill tube positioned in the heated water tank and positioned in alignment with the inlet aperture;
    an insulating tube formed of a thermally insulating material being sized and dimensioned for installation in a heated water tank, the insulating tube positioned in the fill tube and communicating with the inlet aperture for receiving water there through and providing water to the heated water tank;
    a gap being defined between the outside of the insulating tube and inside of the fill tube for providing additional insulation; and
    a fitting for attachment to a heated water tank and the insulating tube.

* * * * *